United States Patent
Gattis et al.

(10) Patent No.: US 9,733,643 B2
(45) Date of Patent: Aug. 15, 2017

(54) HYDRAULIC INTERRUPTER SAFETY SYSTEM AND METHOD

(71) Applicant: AgJunction LLC, Hiawatha, KS (US)

(72) Inventors: Joshua M. Gattis, Robinson, KS (US); Steven A. Koch, Centralia, KS (US)

(*) Notice: Subject to any disclaimer, the term of this patent is extended or adjusted under 35 U.S.C. 154(b) by 134 days.

(21) Appl. No.: 14/579,919

(22) Filed: Dec. 22, 2014

(65) Prior Publication Data

US 2015/0175194 A1    Jun. 25, 2015

Related U.S. Application Data

(60) Provisional application No. 61/919,366, filed on Dec. 20, 2013.

(51) Int. Cl.
| | | |
|---|---|---|
| *B62D 5/07* | (2006.01) | |
| *G05D 1/00* | (2006.01) | |
| *B62D 1/22* | (2006.01) | |
| *B62D 1/28* | (2006.01) | |
| *B62D 5/06* | (2006.01) | |

(52) U.S. Cl.
CPC .......... *G05D 1/0088* (2013.01); *B62D 1/22* (2013.01); *B62D 1/286* (2013.01); *B62D 5/06* (2013.01); *G05D 1/0061* (2013.01); *G05D 2201/0201* (2013.01)

(58) Field of Classification Search
None
See application file for complete search history.

(56) References Cited

U.S. PATENT DOCUMENTS

| | | |
|---|---|---|
| 5,187,664 A | 2/1993 | Yardley et al. |
| 5,194,851 A | 3/1993 | Kraning et al. |
| 5,390,125 A | 2/1995 | Sennott et al. |
| 5,631,658 A | 5/1997 | Gudat et al. |
| 5,646,844 A | 7/1997 | Gudat et al. |
| 5,663,879 A | 9/1997 | Trovato et al. |
| 5,923,270 A | 7/1999 | Sampo et al. |
| 5,928,309 A | 7/1999 | Korver et al. |
| 6,052,647 A | 4/2000 | Parkinson et al. |

(Continued)

FOREIGN PATENT DOCUMENTS

| | | |
|---|---|---|
| JP | 07244150 | 9/1995 |
| WO | 9836288 | 8/1998 |

(Continued)

OTHER PUBLICATIONS

"Extended European Search Report", EPO08700308.3, Jan. 11, 2012.

(Continued)

*Primary Examiner* — Truc M Do
(74) *Attorney, Agent, or Firm* — Schwabe Williamson & Wyatt

(57) ABSTRACT

A system and method for interrupting a Global Navigation Satellite System (GNSS)-based automatic steering mode of a hydraulic steering system on a vehicle. When a steering wheel is manually turned by an operator, pressurized hydraulic fluid from a steering directional control valve activates an interrupter having an interrupter valve. The interrupter valve blocks pressurized fluid flow to the automatic steering system, thus overriding automatic steering and giving the operator full manual steering control via the steering wheel. The hydraulic interrupt system is mechanical with no electronic elements.

32 Claims, 3 Drawing Sheets

(56) References Cited

U.S. PATENT DOCUMENTS

| | | | |
|---|---|---|---|
| 6,067,782 A * | 5/2000 | Diekhans | A01B 69/007 56/10.2 A |
| 6,070,673 A | 6/2000 | Wendte | |
| 6,199,000 B1 * | 3/2001 | Keller | A01B 79/005 342/357.52 |
| 6,212,453 B1 | 4/2001 | Kawagoe et al. | |
| 6,314,348 B1 | 11/2001 | Winslow | |
| 6,336,519 B1 * | 1/2002 | Bohner | B62D 5/30 180/403 |
| 6,354,393 B1 * | 3/2002 | Ahlert | B62D 5/30 180/403 |
| 6,377,889 B1 | 4/2002 | Soest | |
| 6,408,977 B1 * | 6/2002 | Obertrifter | B62D 1/22 180/417 |
| 6,445,983 B1 | 9/2002 | Dickson et al. | |
| 6,445,990 B1 | 9/2002 | Manring | |
| 6,539,303 B2 | 3/2003 | McClure et al. | |
| 6,748,292 B2 | 6/2004 | Mountz | |
| 6,789,014 B1 | 9/2004 | Rekow et al. | |
| 6,804,587 B1 | 10/2004 | O Connor et al. | |
| 6,819,780 B2 | 11/2004 | Benson et al. | |
| 6,865,465 B2 | 3/2005 | McClure | |
| 6,876,920 B1 | 4/2005 | Mailer | |
| 7,065,440 B2 | 6/2006 | Aral | |
| 7,142,956 B2 | 11/2006 | Heiniger et al. | |
| 7,225,060 B2 | 5/2007 | O'Connor et al. | |
| 7,225,068 B2 | 5/2007 | Schick et al. | |
| 7,277,792 B2 | 10/2007 | Overschie | |
| 7,349,779 B2 | 3/2008 | Nelson | |
| 7,363,132 B2 | 4/2008 | Lange et al. | |
| 7,383,114 B1 | 6/2008 | Lange et al. | |
| 7,437,230 B2 | 10/2008 | McClure | |
| 7,460,942 B2 | 12/2008 | Mailer | |
| 7,574,290 B2 | 8/2009 | Gibson et al. | |
| 7,623,952 B2 | 11/2009 | Unruh et al. | |
| 7,689,354 B2 | 3/2010 | Heiniger et al. | |
| 7,840,326 B1 | 11/2010 | Yamada | |
| 7,953,526 B2 | 5/2011 | Durkos et al. | |
| 8,131,432 B2 | 3/2012 | Senneff et al. | |
| 8,140,223 B2 | 3/2012 | Whitehead et al. | |
| 8,160,765 B2 | 4/2012 | Morselli et al. | |
| 8,190,337 B2 | 5/2012 | McClure | |
| 8,239,083 B2 | 8/2012 | Durkos et al. | |
| 8,265,826 B2 | 9/2012 | Feller et al. | |
| 8,437,901 B2 | 5/2013 | Anderson | |
| 8,583,315 B2 | 11/2013 | Whitehead et al. | |
| 8,594,879 B2 | 11/2013 | Roberge et al. | |
| 8,639,416 B2 | 1/2014 | Jones et al. | |
| 8,649,930 B2 | 2/2014 | Reeve et al. | |
| 2002/0072850 A1 | 6/2002 | McClure et al. | |
| 2004/0186644 A1 | 9/2004 | McClure et al. | |
| 2006/0167600 A1 | 7/2006 | Nelson, Jr. et al. | |
| 2007/0251755 A1 * | 11/2007 | Entwistle | B62D 5/003 180/417 |
| 2008/0039991 A1 | 2/2008 | May et al. | |
| 2009/0101430 A1 * | 4/2009 | Sunaga | B62D 15/025 180/421 |
| 2009/0204281 A1 | 8/2009 | McClure et al. | |
| 2009/0265054 A1 | 10/2009 | Basnayake | |
| 2010/0292883 A1 | 11/2010 | Nishijima et al. | |
| 2011/0015817 A1 | 1/2011 | Reeve | |
| 2011/0270495 A1 | 11/2011 | Knapp | |
| 2011/0301784 A1 | 12/2011 | Oakley et al. | |
| 2012/0022781 A1 | 1/2012 | Wilson | |
| 2012/0130593 A1 | 5/2012 | Davis et al. | |
| 2012/0179305 A1 | 7/2012 | Kim et al. | |
| 2013/0013155 A1 * | 1/2013 | Torabi Mirzaee | B62D 5/06 701/43 |
| 2013/0179026 A1 | 7/2013 | McClure et al. | |
| 2013/0289824 A1 | 10/2013 | Mudalige et al. | |
| 2014/0025260 A1 | 1/2014 | McClure | |
| 2014/0138166 A1 | 5/2014 | Otto et al. | |
| 2014/0207336 A1 | 7/2014 | Oblizajek et al. | |
| 2014/0214275 A1 | 7/2014 | Miller et al. | |
| 2014/0270380 A1 | 9/2014 | Morin | |
| 2014/0277956 A1 | 9/2014 | Morin | |
| 2014/0297116 A1 | 10/2014 | Anderson et al. | |
| 2014/0324291 A1 | 10/2014 | Jones et al. | |

FOREIGN PATENT DOCUMENTS

| | | |
|---|---|---|
| WO | 2005119386 | 12/2005 |
| WO | 2008080193 | 7/2008 |
| WO | 2010005945 | 1/2010 |

OTHER PUBLICATIONS

"International Preliminary Report on Patentability and Written Opinion", PCT/AU2008/000002, Jul. 7, 2009.
"International Preliminary Report on Patentability and Written Opinion", PCT/US2009/033693, Aug. 19, 2010.
"International Preliminary Report on Patentability and Written Opinion", PCT/US2004/015678, Nov. 21, 2006.
"International Preliminary Report on Patentability and Written Opinion", PCT/US2005/022433, Dec. 28, 2006.
"International Search Report", PCT/AU2008/000002, Feb. 28, 2008.
"International Search Report", PCT/US2004/015678, Jun. 13, 2005.
"International Search Report", PCT/US2005/022433, Sep. 16, 2005.
"International Search Report and Written Opinion", PCT/US2009/033693, Mar. 30, 2009.
Topcon Precision Agriculture, "AES-25 Accurate Electric Steering", http://www.topconpa.com/products/guidance-systems/electric-steering/aes-25, accessed Oct. 3, 2011.
Trimble Navigation Limited, "AgGPS EZ-Steer Sales Brochure", http://www.trimble.com/Agriculture/, last accessed 2011, last updated Mar. 2010.
Noh, Kwang-Mo, Self-tuning controller for farm tractor guidance, Iowa State University Retrospective Theses and Dissertations, Paper 9874, (1990).
Van Zuydam,. R.P., Centimeter-Precision Guidance of Agricultural Implements in the Open Field by Means of Real Tim Kinematic DGPS, ASA-CSSA-SSSA, pp. 1023-1034 (1999).

* cited by examiner

Closed Center

Open Center

HYDRAULIC INTERRUPTER SAFETY SYSTEM AND METHOD

CROSS-REFERENCE TO RELATED APPLICATION

This application claims priority in U.S. Provisional Patent Application No. 61/919,366, filed Dec. 20, 2013, which is incorporated herein by reference.

BACKGROUND OF THE INVENTION

1. Field of the Invention

The present invention relates generally to vehicle steering, and in particular to a hydraulic safety interrupter for automatic steering ("autosteer") systems, which can use sensors including Global Navigation Satellite System (GNSS), and other guidance and navigation receivers and equipment.

2. Description of the Related Art

A. GNSS-Based Vehicle Guidance Background

The use of sensors for automating vehicle guidance and machine control has significantly advanced these fields and enabled a number of applications, including many in agriculture, transportation and other industries. For example and without limitation, GNSSs are commonly used for guidance, navigation and machine control. GNSSs include the Global Positioning System (GPS) and other satellite-based systems. Various GNSS receivers are available for aviation, marine and terrestrial vehicles. The GNSS information provided by such receivers can be processed and used for navigation. In more sophisticated systems, vehicle guidance can be automatically controlled using such information. For example, a predetermined travel or flight path can be programmed into an on-board computer. The vehicle guidance system can automatically maintain appropriate course parameters, such as course, heading, speed, altitude, end-of-row U-turns, etc. Control system, feedback theory, and signal filtering techniques can be used to interactively anticipate (with higher order systems) and compensate for course deviations and navigation errors. Such sophisticated autopilot and automatic steering systems tend to involve powerful computers and complex flight and steering controls integrated with manual controls.

Accurate vehicle guidance and equipment control are important objectives in agricultural operations generally and agricultural equipment specifically. For example, cultivating, tilling, planting, spraying, fertilizing, harvesting and other farming operations typically involve specialized equipment and materials, which are operated and applied by making multiple passes over cultivated fields. Ideally, the equipment is guided through accurately-spaced passes or swaths, the spacing of which is determined by the swath width of the equipment.

GNSS technology advanced the field of agricultural guidance by enabling reliable, accurate systems which are relatively easy to use. GNSS guidance systems are adapted for displaying directional guidance information to assist operators with manually steering the vehicles. For example, the Outback steering guidance product line was developed primarily for agricultural applications. Current GNSS-based products include the Outback S3, the eDrive TC and the eDrive X™ which are available from Outback Guidance (www.outbackguidance.com) and are manufactured by AgJunction, Inc. (www.agjunction.com) of Hiawatha, Kans. These products are covered by U.S. Pat. No. 6,539,303 and U.S. Pat. No. 6,711,501, which are incorporated herein by reference. They include on-board computers which can be programmed for steering vehicles through various straight-line and curved ("contour") patterns. An advantage of this system is its ability to retain field-specific cultivating, planting, spraying, fertilizing, harvesting and other patterns in memory. This feature enables operators to accurately retrace such patterns. Another advantage relates to the ability to interrupt operations for subsequent resumption by referring to system-generated logs of previously treated areas.

The OUTBACK S™ GNSS guidance system provides the equipment operators with real-time visual indications of heading error with a steering guide display and crosstrack error with a current position display. They respectively provide steering correction information and an indication of the equipment position relative to a predetermined course. Operators can accurately drive patterns in various weather and light conditions, including nighttime, by concentrating primarily on such visual displays. Significant improvements in steering accuracy and complete field coverage are possible with this system.

Another type of GNSS vehicle guidance equipment automatically steers the vehicle along all or part of its travel path and can also control an agricultural procedure or operation, such as spraying, planting, tilling, harvesting, etc. Examples of such equipment are shown in U.S. Pat. No. 7,142,956, which is incorporated herein by reference. U.S. Pat. No. 7,437,230 shows satellite-based vehicle guidance control in straight and contour modes, and is also incorporated herein by reference.

GNSS guidance systems and equipment are distinguished by their vehicle path configuration capabilities. Initially, straight-line AB (i.e., between points A and B) guidance consists of multiple, parallel straight lines, which are separated by the swath widths of the vehicles. Straight line AB guidance is ideally suited for rectangular fields and continuously-repeating, parallel swathing.

Non-rectangular and terraced fields typically require curvilinear vehicle paths that follow the field perimeters and the terraced elevation contours. Contour guidance systems and methods were developed to accommodate such field conditions using GNSS coordinates to define curvilinear vehicle paths. See, for example, Korver U.S. Pat. No. 5,928,309. GNSS positions can be logged on-the-fly at intervals of, for example, 0.20 seconds. Contour guidance can be accomplished by computer-generating each subsequent pass from the GNSS-defined previous pass and a user-entered swath width.

Another type of GNSS contour guidance equipment outputs guidance signals relative to the edges of all previously logged swaths. Such logged swaths typically correspond to field areas where operations, e.g. spraying, have already been carried out. See, for example, U.S. Pat. No. 6,539,303 and U.S. Pat. No. 6,711,501, which are assigned to a common assignee herewith and are incorporated herein by reference.

Automatic steering accommodates "hands-off" operation, taking into account vehicle operating parameters, such as turning radii, speeds, swath widths, etc. Appropriate machine control functions, such as implement steering and spray boom control, can also be automated.

B. Manual-Automatic Steering Interface

Although agricultural operations have utilized robotic equipment without human operators on-board, standard practice is to provide an operator with the ability to override the automatic steering system. For example, some automatic steering systems will disengage when operator input, e.g., via steering wheel, is sensed. On-board computers can detect such manual turning inputs and issue appropriate output commands for disengaging auto-steering functions. GNSS-guided automatic steering can be accomplished with hydraulic valve blocks retrofit on existing vehicles, or installed as original equipment in new vehicles. GNSS receivers provide positioning and navigation data, which can be processed by on-board microprocessors for steering and other vehicle control functions. An advantage of the present invention is to provide a hydraulic steering interrupter which is manually-activated and is independent of the automated, computerized steering controls. Heretofore there has not been available a hydraulic steering interrupter with the advantages and features of the present invention.

SUMMARY OF THE INVENTION

In the practice of the present invention, an interrupter is provided for a hydraulic steering system on a vehicle, which can utilize GNSS-based auto steering. The interrupter is preferably positioned upstream of an auto-steering hydraulic valve block, and activates automatically when a steering wheel is manually turned by the operator. The interrupter senses a pressure signal from the vehicle manual steering and interrupts (i.e., blocks) pressurized hydraulic fluid flow to the automatic steering input valve, thus canceling the automatic steering command and giving the operator full manual steering control via the steering wheel.

DETAILED DESCRIPTION OF THE PREFERRED EMBODIMENTS

I. Introduction and Environment

Figure 1:
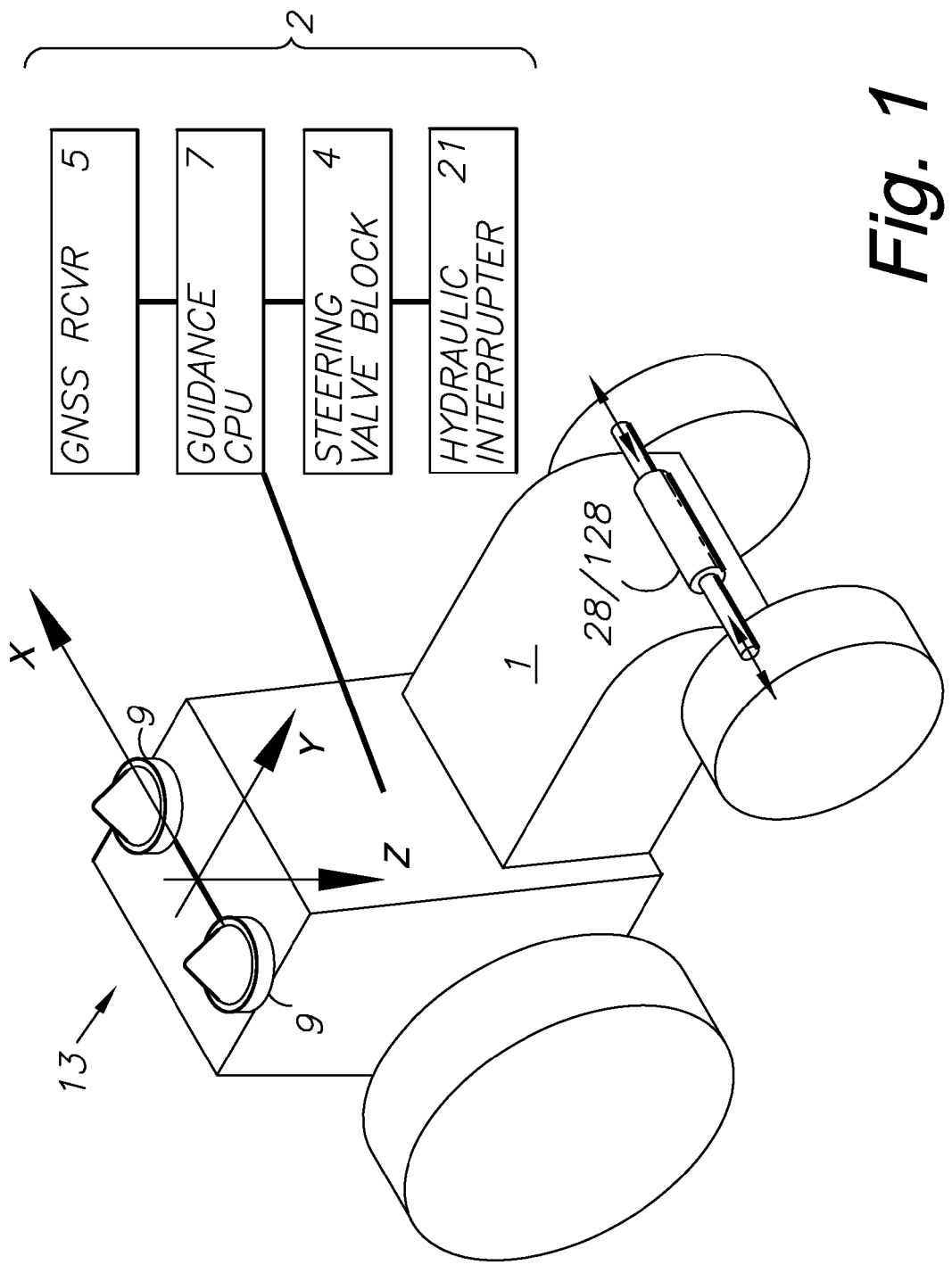
FIG. 1 is a perspective view of a vehicle, such as a tractor, equipped with a hydraulic interrupter in a GNSS-based automatic steering system, embodying an aspect of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning.

Without limitation on the generality of useful applications of the present invention, a hydraulic interrupter 21 is provided in a steering control system 2 on a vehicle 1, which can comprise a tractor equipped with a Global Navigation Satellite System (GNSS) 13. The GNSS system 13 includes a receiver 5 which can be connected to a pair of antennas 9 for vector directional guidance in a horizontal plane based on differencing the signals received at the respective antennas 9. Such directional guidance techniques are used for obtaining a vehicle heading in an X-Y (horizontal) plane, even with the vehicle stationary. A guidance central processing unit (CPU) 7 is connected to the receiver 5 for processing the GNSS positioning signals and outputting guidance signals to the steering control system 2 for auto-steering the vehicle 1. The vehicle 1 can also be equipped with a tow-behind implement, which can also be provided with GNSS-based control interfacing with the vehicle steering control system 2. For example, implement-steering can provide advantages in certain agricultural and other operations.

II. Closed Center Embodiment Steering Control System 2

The steering control system 2 embodying the present invention can be installed in various vehicles with manual controls, such as a steering wheel 8, and an electric-hydraulic power steering subsystem 4 for assisting manual steering and for primarily steering the vehicle in automatic guidance operating modes (i.e., "auto-steer"). The electric-hydraulic steering subsystem 4 is adapted for coupling to a guidance system, such as the GNSS-based guidance system 13 described above. The steering subsystem 4 includes a hydraulic interrupter 21 with an interrupter valve 22 adapted for manually overriding or interrupting the electric-hydraulic steering subsystem 4 and returning control to an operator via the steering wheel 8. The power steering subsystem 4 can be hydraulic, electric-over-hydraulic, pneumatic, etc.

Figure 2:
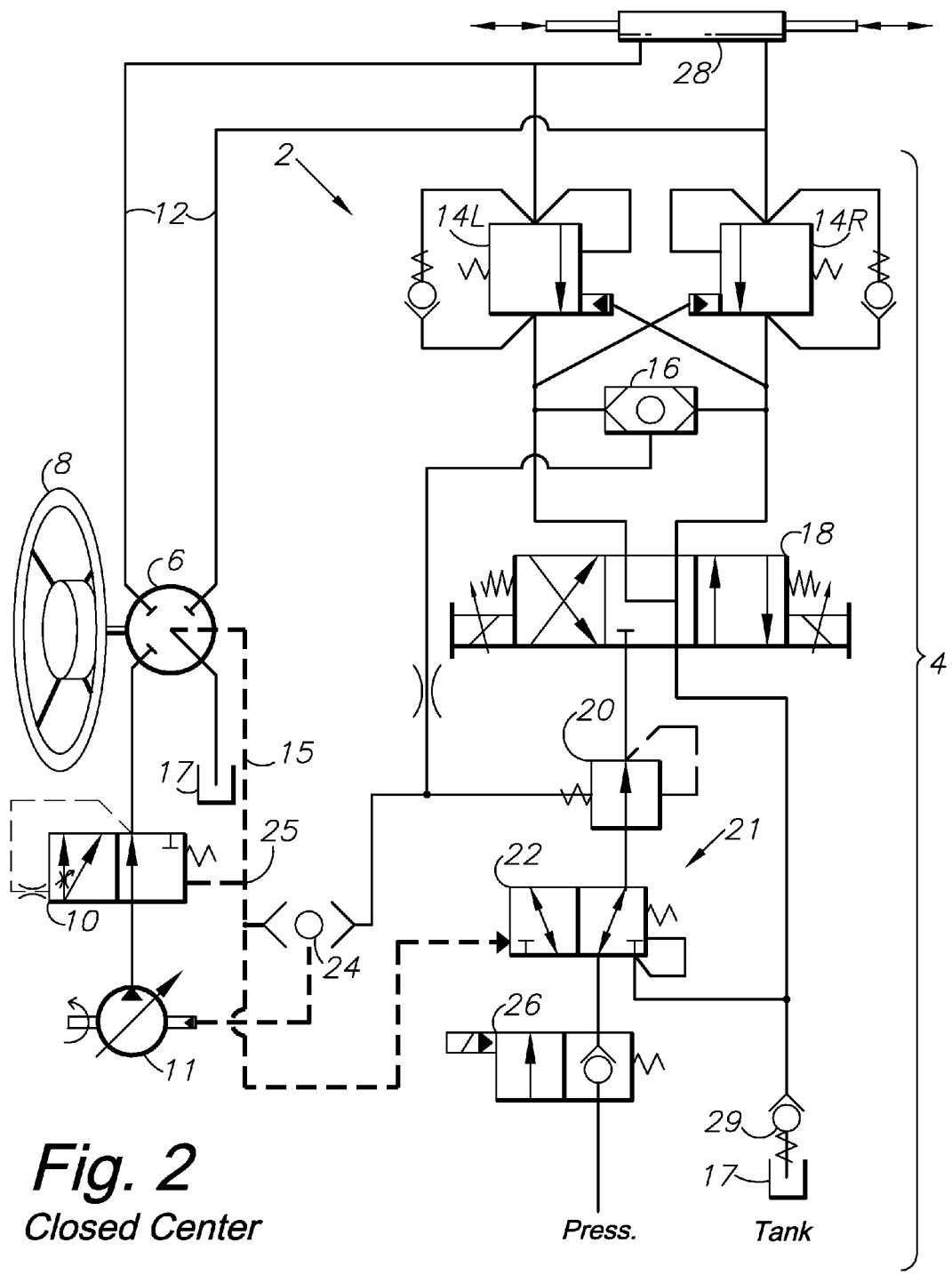
FIG. 2 is a block diagram of a closed center steering system including a hydraulic interrupter embodying an aspect of the present invention.

The steering control system 2 includes a steering directional control valve 6 connected to the steering wheel 8. A steering priority valve 10 connects the steering directional control valve 6 to a pump 11 mounted on the vehicle 1. In an embodiment of the present invention, the steering directional control valve 6 has a "closed center" configuration (FIG. 2). A load sense line 15 extends from the steering directional control valve 6 to a load sense shuttle valve 24 and the steering priority valve 10 via a "T" connection 25. The load sense line 15 activates the interrupter valve 22 by detecting or "sensing" greater hydraulic pressure from the steering directional control valve 6 signaling an operator turning a steering wheel 8 and thus manually taking over the vehicle steering. An "override" condition thus occurs, interrupting the automatic steering operation by interrupting the hydraulic fluid flow to the proportional flow control directional valve 18.

Hydraulic lines 12 connect the steering directional control valve 6 to respective right and left load holding valves 14R, 14L, which are adapted for maintaining certain fluid pressure levels in the electric-hydraulic power steering subsystem 4. The system 4 steers the vehicle 1 via a double-acting hydraulic cylinder 28, which can link directly to the vehicle steering gear. A shuttle valve 16 is positioned between the load holding valves 14R, 14L. A proportional flow control directional valve 18 receives a constant flow of hydraulic fluid via a pressure compensating valve 20. The pressure drop across the compensating valve 20 is maintained relatively constant. The interrupter valve 22 is located between the pressure compensating valve 20 and an enabling valve 26, which is solenoid-activated by the GNSS-based steering subsystem 4. The interrupter valve 22 is spring-loaded for maintaining an open position until an override closes it or blocks pressure flow to the auto-steering subsystem 4. Such an override signal originates with the steering priority valve 10 at the T connect 25, which acts on a load sense shuttle valve 24. The load sense shuttle valve 24 provides an input to the pump 11 for varying the displacement as necessary to accommodate the steering system loads. For example, in the configuration shown, the load sense shuttle ball would move to the right (FIG. 2) for manual steering. In an automatic steering mode (i.e., enable valve 26 open), the ball would be in the left position. Hydraulic fluid is pumped from and returned to a tank 17 having a check valve 29.

III. Open-Center Alternative Embodiment Steering Control System 102 (FIG. 3)

Figure 3:
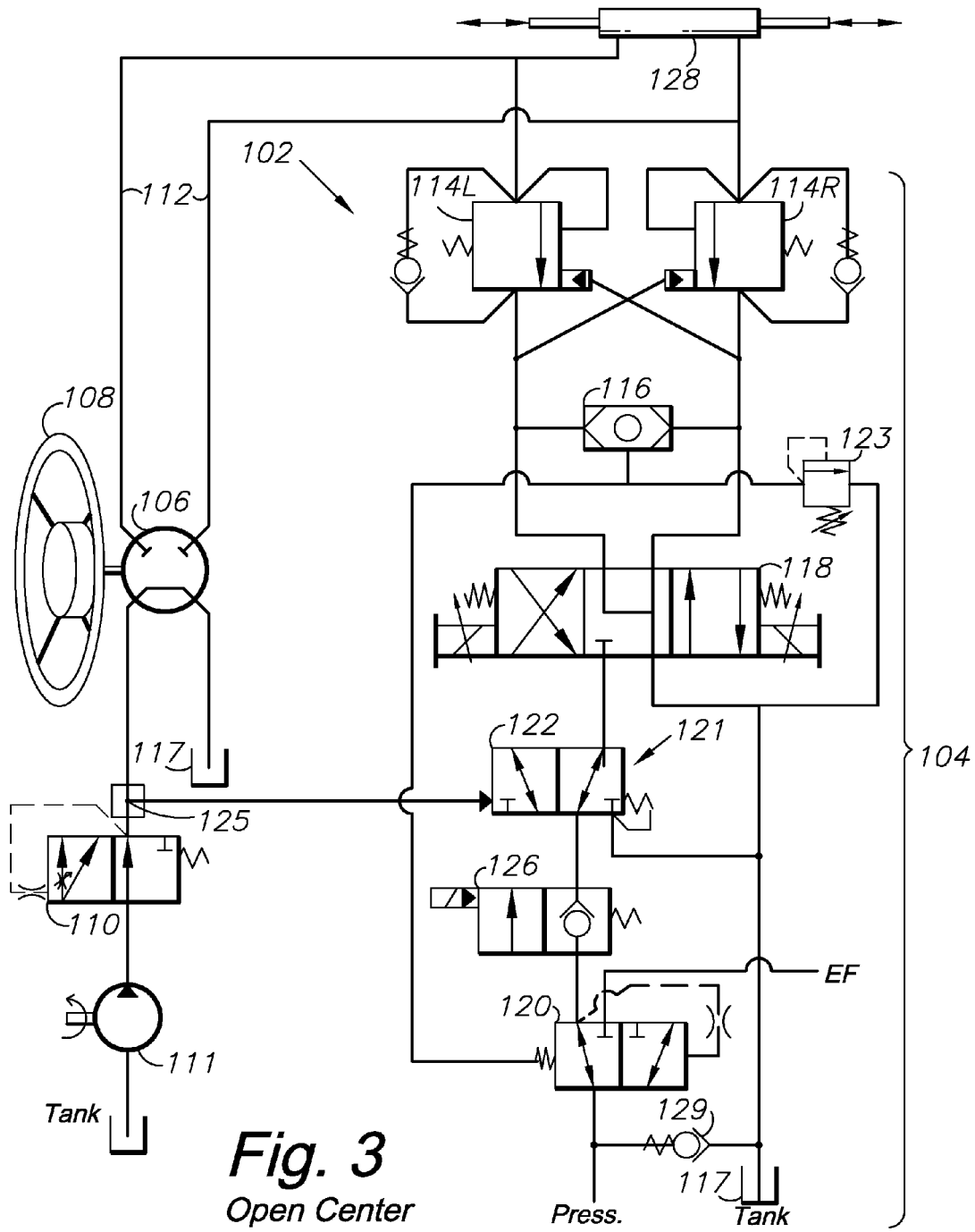
FIG. 3 is a block diagram of an open center steering system including a hydraulic interrupter comprising an alternative aspect of the present invention.

An open-center steering control system 102 comprising an alternative embodiment of the present invention is shown in FIG. 3. The open center hydraulic circuit utilizes a continuous flow of hydraulic fluid, which is returned to the tank 117 through an "open center" of a steering directional control valve 106 connected to and controlled by a steering wheel 108. The control system 102 includes an auto-steer subsystem 104, a steering priority valve 110, a pump 111, and hydraulic lines 112, which have similar functions to the corresponding components described above. An interrupter valve 122 is provided for interrupting the fluid flow like the interrupter valve 22 described above. A "T" connector 125 supplies fluid to a pressure compensating valve 120. An enable valve 126 connects to the interrupter valve 122. A hydraulic interrupter 121 comprises the interrupter valve 122 and other components connected thereto for interrupting pressure flow to the auto-steer subsystem 104 when the steering wheel 108 is moved. A check valve 129 extends between lines connecting a pressure side of the circuit and a return to the tank 117. Excess flow EF from the hydraulic interrupter valve 122, which occurs because of the open center configuration, can be returned to the tank 117.

The system 102 also includes left and right load holding valves 114L, 114R, which connect to respective sides of the steering piston-and-cylinder unit 128. A shuttle valve 116 connects the fluid inlet sides of the load holding valves 114L, 114R. A proportional flow control valve 118 is connected to the load holding valves 114L, 114R and to a directional valve 123.

IV. Conclusion

It is to be understood that the invention can be embodied in various forms, and is not to be limited to the examples discussed above. Other components can be utilized. For example, various other types of sensor systems can be utilized in conjunction with hydraulic systems with the advantages and features of the hydraulic interrupter valve discussed above.

Having thus described the invention, what is claimed as new and desired to be secured by Letters Patent is:

1. A steering interrupt system for a vehicle, which vehicle includes steerable wheels, a hydraulic steering system with a pressurized fluid source, a steering directional control valve connected to the pressurized fluid source, a steering wheel connected to the steering directional control valve, a steering actuator selectively connected to the pressurized fluid source via the steering directional control valve, and an automatic steering system automatically controlling the steering actuator in an automatic steering mode, the steering interrupt system comprising:
   a load sensor connected to the steering directional control valve; and
   an interrupt valve connected to the steering directional control valve and the load sensor, the interrupt valve configured to switch from a first state in the automatic steering mode to a second state in an interrupt mode and block pressurized fluid flow from the automatic steering system to the steering actuator based on a fluid pressure load sensed by the load sensor from turning of the steering wheel by an operator, wherein during the interrupt mode:
   the steering directional control valve provides pressurized hydraulic fluid to the steering actuator and to control the steerable wheels in proportion to movement of the steering wheel by the operator; and
   the interrupt valve is configured to switch from the second state during the interrupt mode back to the first state in the automatic steering mode and unblock the pressurized fluid flow to the steering actuator based on the fluid pressure load sensed by the load sensor indicating the steering wheel is released by the operator.

2. The steering interrupt system according to claim 1, wherein the automatic steering system includes a Global Navigation Satellite System (GNSS)-based positioning system.

3. The steering interrupt system according to claim 1, wherein the steering actuator includes a piston-and-cylinder unit.

4. The steering interrupt system according to claim 1, wherein the hydraulic steering system includes a closed center hydraulic circuit.

5. The steering interrupt system according to claim 1, wherein the hydraulic steering system includes an open center hydraulic circuit.

6. A steering interrupt system for a vehicle, which vehicle includes steerable wheels, a hydraulic steering system with a pressurized fluid source, a steering directional control valve connected to the pressurized fluid source, a steering wheel connected to the steering directional control valve, a steering actuator selectively connected to the pressurized fluid source via the steering directional control valve, and an automatic steering system to automatically control the steering actuator in an automatic steering mode, the steering interrupt system comprising:
   an interrupt valve connected to the steering directional control valve configured to switch from the automatic steering mode to an interrupt mode where the interrupt valve interrupts pressurized fluid flow to the steering actuator and the steering directional control valve provides pressurized hydraulic fluid to the steering actuator, wherein:
   the interrupt valve is spring-loaded;
   the spring of the interrupt valve is configured to expand in the automatic steering mode maintaining an open position allowing the pressurized fluid flow therethrough; and
   the spring of the interrupt valve is configured to compress in the interrupt mode, closing the interrupt valve and blocking the pressurized fluid flow.

7. A steering interrupt system, comprising:
   a steering priority valve selectively connecting a pump for a pressurized fluid source to a steering directional control valve;

a solenoid-actuated valve connected to the pressurized fluid source and activated by an automatic steering system;
a pressure-compensating valve connected to the pressurized fluid source;
a proportional flow control directional valve connected to the pressurized fluid source and operated by the automatic steering system;
a pair of load-holding valves connected between the proportional flow control directional valve and a steering actuator;
a shuttle valve connected between the load-holding valves and the proportional flow control directional valve; and
an interrupt valve connected to the steering directional control valve and the steering priority valve configured to block pressurized fluid flow to the steering actuator based on the steering directional control valve indicating manual turning of a steering wheel.

8. A steering interrupt system for a vehicle, comprising:
an interrupt valve connected to a steering directional control valve and configured to interrupt pressurized fluid flow in a hydraulic steering system to a steering actuator when a steering wheel is turned by an operator; and
a load sensor connected to the steering directional control valve, a load sense shuttle valve, and the interrupt valve, wherein:
the load sensor is configured to sense a fluid pressure load resulting from the operator turning the steering wheel; and
the interrupt valve is configured to interrupt the pressurized fluid flow in response to the fluid pressure load sensed by the load sensor.

9. The steering interrupt system according to claim 1, wherein the hydraulic steering system further comprises:
a fluid tank; and
an excess flow line configured for selectively diverting excess pressurized fluid from the steering directional control valve to the fluid tank.

10. A hydraulic steering system for a vehicle, comprising:
a steering directional control valve coupled between a steering wheel and a steering actuator;
a load sensor connected to the steering directional control valve; and
an interrupt valve connected to the steering directional control valve and the load sensor and configured to block pressurized fluid flow to a steering actuator based on a fluid pressure load sensed by the load sensor from manual turning of the steering wheel, wherein;
the steering directional control valve is configured to control the steering actuator while the interrupt valve blocks the pressurized fluid flow to the steering actuator; and
the interrupt valve is configured to unblock the pressurized fluid flow from to the actuator based on the fluid pressure load sensed by the load sensor indicating the steering wheel is released by said operator.

11. The hydraulic steering system according to claim 10, further comprising:
a Global Navigation Satellite System (GNSS)-based positioning system connected to the steering actuator; and
wherein an automatic steering mode of the hydraulic steering system is controlled by the GNSS-based positioning system.

12. The hydraulic steering system according to claim 10, wherein the steering actuator includes a piston-and-cylinder unit.

13. The hydraulic steering system according to claim 10, further comprising a closed center hydraulic circuit.

14. The hydraulic steering system according to claim 10, further comprising an open center hydraulic circuit.

15. A hydraulic steering system for a vehicle, comprising:
a steering directional control valve coupled between a steering wheel and a steering actuator; and
an interrupt valve connected to the steering directional control valve and configured to block pressurized fluid flow to the steering actuator in response to manual turning of the steering wheel, wherein;
the steering directional control valve is configured to control the steering actuator while the interrupt valve blocks the pressurized fluid flow to the steering actuator;
the interrupt valve is configured to unblock the pressurized fluid flow to the steering actuator when the steering wheel is released by the operator;
the interrupt valve is spring-loaded;
the spring of the spring-loaded interrupt valve is configured to expand maintaining an open position allowing the pressurized fluid flow therethrough; and
the spring of the spring-loaded interrupt valve is configured to compress closing the spring-loaded interrupt valve and block the pressurized fluid flow.

16. A hydraulic steering system for a vehicle, comprising:
a steering directional control valve coupled between a steering wheel and a steering actuator;
an interrupt valve connected to the steering directional control valve and configured to block pressurized fluid flow in a hydraulic steering system to the steering actuator in response to a sensed manual turning of the steering wheel by the steering directional control valve; and
a steering priority valve coupling a pump to the steering directional control valve to control the steering actuator while the interrupt valve blocks the pressurized fluid flow.

17. The hydraulic steering system according to claim 10, wherein the interrupt valve is configured to close in response to the fluid pressure load sensed by the load sensor.

18. The hydraulic steering system according to claim 16, further comprising:
a fluid tank; and
an excess flow line configured to selectively divert excess pressurized fluid from the steering directional control valve to the fluid tank.

19. A hydraulic steering system for a vehicle including steerable wheels, comprising:
a steering directional control valve selectively connecting a pressurized fluid source to a steering actuator;
an interrupt valve connected to the steering directional control valve and configured to block pressurized fluid flow to the steering actuator; and
a steering priority valve selectively connecting a pump to the steering directional control valve based on a load sense line connected between the steering directional control valve and the interrupt valve indicating manual operation of a steering wheel, wherein:
the steering wheel is configured to control steerable wheels via the steering directional control valve and the steering actuator during the manual operation of the steering wheel, and
the hydraulic steering system is configured to switch to an automatic steering mode where an auto-steering system controls the steering actuator and the steerable wheels when the load sense line indicates termination of the manual operation of the steering wheel.

20. The hydraulic steering system according to claim 19, further comprising a closed center hydraulic circuit including a load sensor connected to the steering directional control valve and a load sense shuttle valve, the load sensor configured to activate the interrupt valve based on a sensed fluid pressure load resulting from the manual turning of the steering wheel.

21. The hydraulic steering system according to claim 19, further comprising an open center hydraulic circuit including:
 a fluid tank connected to the steering directional control valve; and
 an excess flow line configured for selectively diverting excess pressurized fluid through the steering directional control valve to the fluid tank.

22. A method of interrupting automatic steering of a vehicle, comprising:
 operating a hydraulic steering system in an automatic steering mode where an automatic steering system automatically controls a steering actuator and steers wheels connected to the steering actuator;
 sensing an operator turning a steering wheel;
 sensing with a load sensor a fluid pressure load from a steering directional control valve;
 activating an interrupt valve when the sensed fluid pressure load indicates manual operation of the steering wheel;
 blocking with the activated interrupt valve pressurized fluid flow from the automatic steering system to the steering actuator;
 directing with the steering directional control valve pressurized fluid to the steering actuator to control the steerable wheels in proportion to manual movement of steering wheel by the operator;
 deactivating the interrupt valve when the sensed fluid pressure load from the load sensor indicates termination of the manual operation of the steering wheel;
 allowing with the deactivated interrupt valve fluid flow from the automatic steering system said back to the steering actuator and reactivation of the automatic steering mode; and
 operating the hydraulic steering system back in the automatic steering mode where the automatic steering system automatically controls the steering actuator and steers the wheels.

23. The method according to claim 22, wherein the automatic steering system includes a Global Navigation Satellite System (GNSS)-based positioning system.

24. The method according to claim 22, wherein the steering actuator includes a piston-and-cylinder unit.

25. The method according to claim 22, wherein the hydraulic steering system includes a closed center hydraulic circuit.

26. The method according to claim 22, wherein the hydraulic steering system includes an open center hydraulic circuit.

27. The method according to claim 22, wherein the hydraulic steering system further comprises:
 a pressurized fluid source including a pump;
 a steering priority valve selectively connecting the pump and the steering directional control valve;
 a solenoid-actuated valve connected to the pressurized fluid source and activated by the automatic steering system;
 a pressure-compensating valve connected to the pressurized fluid source;
 a proportional flow control directional valve connected to the pressurized fluid source and operated by the automatic steering system;
 a pair of load-holding valves connected to the proportional flow control directional valve and the steering actuator; and
 a shuttle valve connected to the load-holding valves and the proportional flow control directional valve.

28. The method according to claim 27, wherein:
 the interrupt valve is spring-loaded and a spring of the spring-loaded interrupt valve compresses, closing the interrupt valve in an interrupt mode;
 the pump displaces the pressurized fluid through the steering directional control valve;
 the steering priority valve sends an override signal to the automatic steering system in the interrupt mode;
 the spring of the spring-loaded interrupt valve expands opening the interrupt valve in the automatic steering mode;
 the solenoid-actuated valve controls pressurized fluid flow in the automatic steering mode as directed by the automatic steering system;
 the pressure-compensating valve maintains fluid flow pressure;
 the proportional flow control directional valve controls the directional flow of the pressurized fluid to the load-holding valves as directed by the automatic steering system;
 the load-holding valves control pressurized fluid flow to the steering actuator; and
 the shuttle valve prevents backflow of fluid from the load-holding valves back to the proportional flow control directional valve.

29. The method according to claim 22, wherein:
 the load sensor includes a load sense shuttle valve configured to sense the fluid pressure load resulting from manual operation of the steering wheel; and
 the interrupt valve is configured to close in response to the sensed fluid pressure load by the load sensor.

30. The method according to claim 29, further comprising:
 the interrupt valve closing in response to the sensed fluid pressure load by the load sensor; and
 the load sense shuttle valve triggering a change in fluid flow pressure and preventing pressurized fluid flow to the automatic steering system.

31. The method according to claim 22, wherein the hydraulic steering system further comprises:
 a fluid tank; and
 an excess flow line configured to divert excess pressurized fluid from the steering directional control valve to the fluid tank.

32. The method according to claim 31, further comprising:
 maintaining with the steering directional valve pressurized fluid flow from the hydraulic steering system to the steering actuator; and
 diverting excess pressurized fluid from the hydraulic steering system to the fluid tank.

* * * * *